Figure 1:
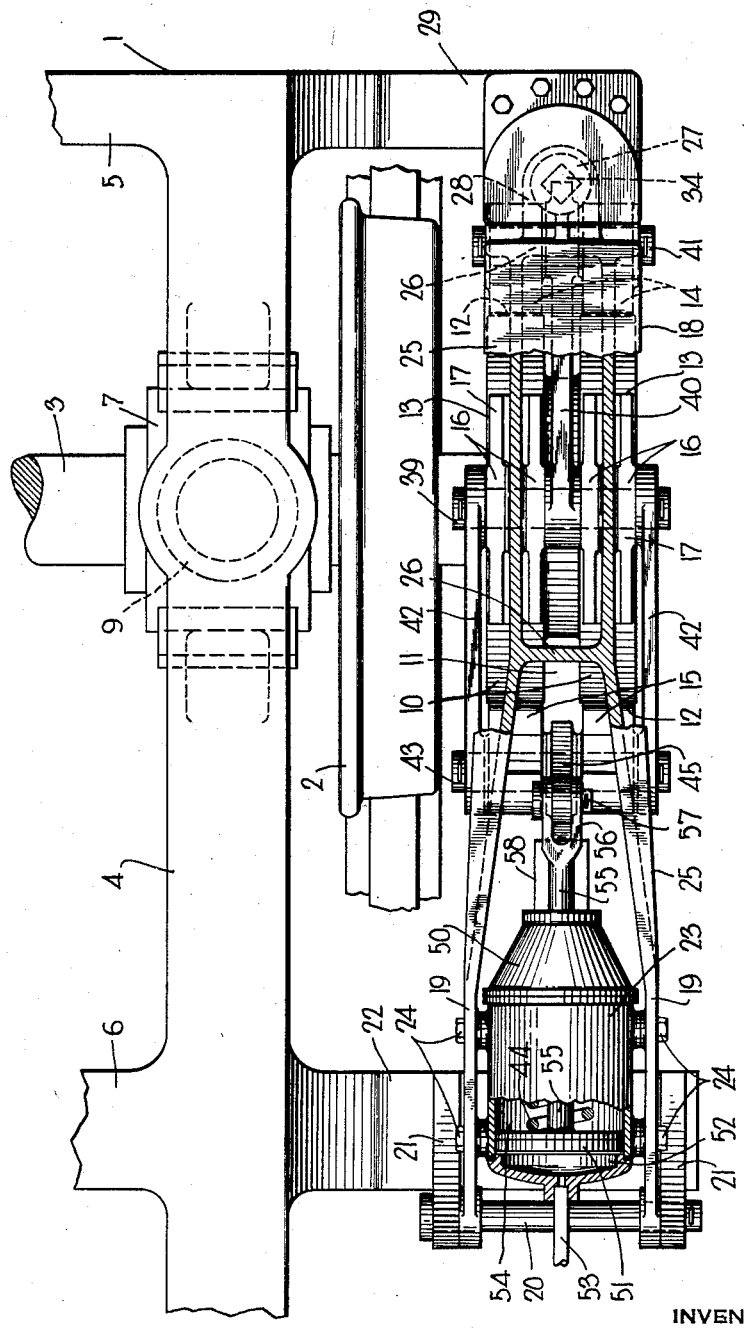

Oct. 31, 1939.　　　R. J. BUSH ET AL　　　2,177,959
BRAKE MECHANISM
Filed Feb. 28, 1939　　2 Sheets-Sheet 1

INVENTORS
RANKIN J. BUSH
WILLIAM H. GLASS
BY
*A. M. Higgins*
ATTORNEY

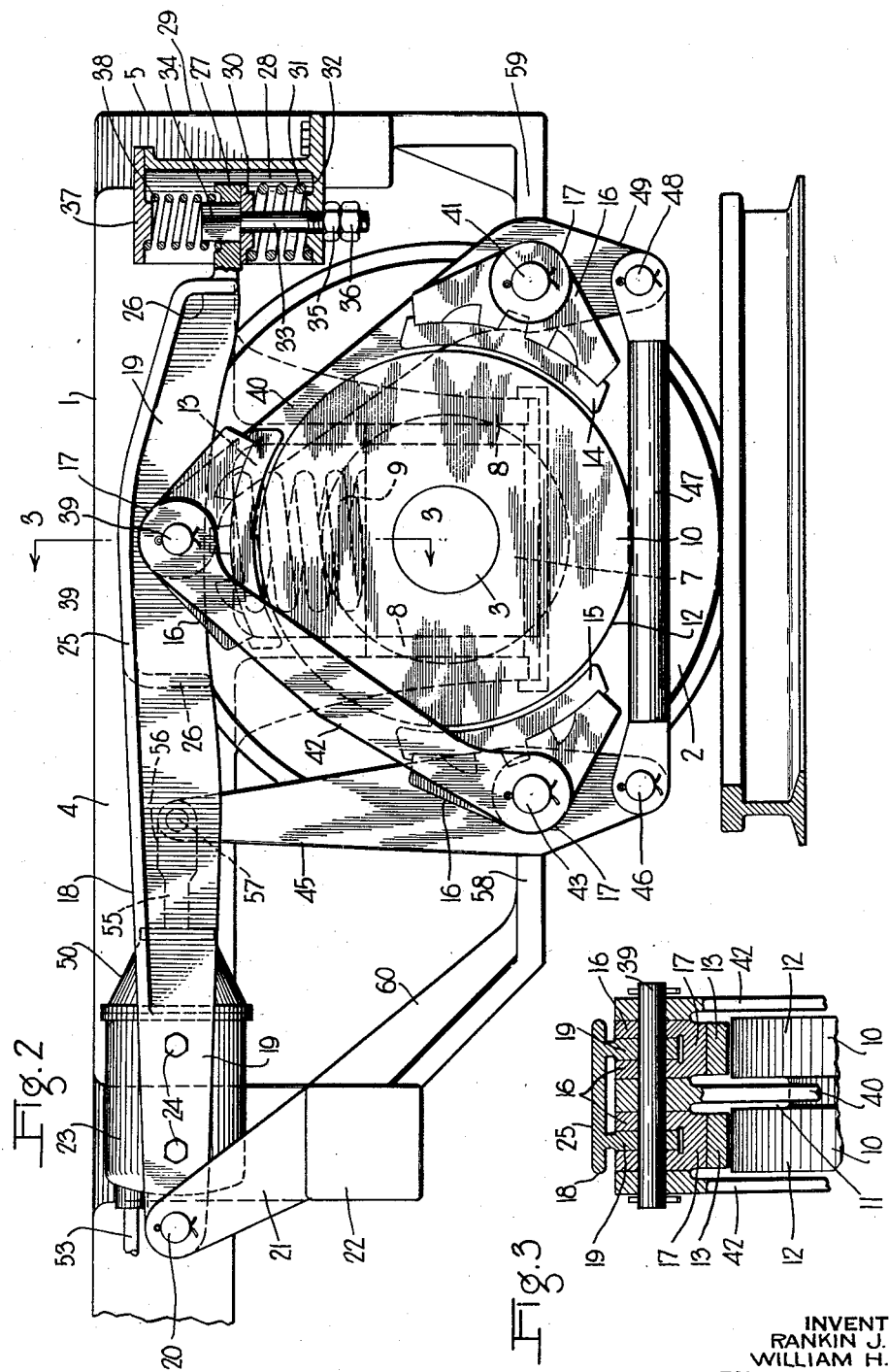

Patented Oct. 31, 1939

2,177,959

UNITED STATES PATENT OFFICE 2,177,959

BRAKE MECHANISM

Rankin J. Bush, Jeannette, and William H. Glass, Pittsburgh, Pa., assignors to The Westinghouse Air Brake Company, Wilmerding, Pa., a corporation of Pennsylvania Application February 28, 1939, Serial No. 258,942

25 Claims. (Cl. 188—58)

This invention relates to brake rigging for railway vehicle trucks and more particularly to the general type disclosed in the pending application of Carlton D. Stewart, Serial No. 214,517, filed June 13, 1938, in which the downwardly acting forces set up in the brake rigging by clasp arranged brake shoes, when in frictional braking engagement with the wheel and axle assembly, are transmitted to the assembly instead of to the truck frame and are thus employed for forcing an additional brake shoe or shoes into braking engagement with the assembly to assist in braking the assembly.

The brake rigging disclosed in the above mentioned pending application comprises one or more brake shoes or pairs of brake shoes arranged in clasp relation at opposite sides of and below the axis of the wheel and axle assembly and supported by substantially vertically arranged hangers pivotally connected at their upper ends to spaced portions of a beam. One end of this beam is pivotally connected to the truck frame preferably adjacent the longitudinal center thereof. A third brake shoe, or a pair of brake shoes, is pivotally connected to the beam between the hangers directly over the assembly.

When an application of the brakes is effected with the above described arrangement, the oppositely disposed clasp arranged brake shoes are forced toward each other into engagement with the assembly and due to the shoes engaging the assembly below its axis, said shoes are forced downwardly around the assembly a certain degree and in so moving turn the beam about its pivotal connection with the truck frame and thus draw the additional shoe or shoes located above the assembly into braking engagement therewith. The additional brake shoe or shoes thus act not only to effect a certain degree of braking of the assembly but also act through the beam to support the clasp arranged brake shoes in braking relation with the assembly.

In any clasp brake arrangement embodying oppositely disposed brake shoes located below the axis of the assembly, a greater force is required to support the shoe or shoes at the leading side of the assembly than at the trailing side, since at the leading side the assembly acts to drag the brake shoes downwardly while at the trailing side the assembly tends to lift the brake shoes.

Therefore in a brake rigging such as above described, the degree of pressure, and therefore the degree of braking, of the additional shoe or shoes on the assembly depends upon the location of the pivotal connection between the beam and truck frame with respect to the leading and trailing sides of the wheel and axle assembly, such pressure being greater when the pivotal connection is at the trailing side of the assembly, since the brake shoe at the leading side of the assembly is provided with a longer lever arm to force the additional shoe into braking contact with the assembly.

With the above facts in mind and also the fact that during retardation the leading wheel and axle assembly of a truck carries a larger portion of the load than the rear wheel and axle assembly, the brake mechanism disclosed in the aforementioned Stewart application was so arranged and applied to the wheel and axle assemblies of the truck as to brake the leading assembly to a greater degree than the trailing assembly, in order to provide for maximum braking and retardation of the truck.

In certain instances it may however be desirable to brake all of the wheel and axle assemblies of a vehicle truck to the same uniform degree, and one object of the invention is therefore to provide a novel brake arrangement of the above general type for accomplishing this result.

Another object of the invention is to provide a novel brake arrangement, of the type above described, in which the parts are so designed and arranged as to provide the same degree of braking of a wheel and axle assembly for both directions of rotation thereof.

In the construction disclosed in the above mentioned Stewart application the clasp brake shoes are connected to the beam at opposite sides of the connection between the beam and the additional brake shoe or shoes. During braking this results in subjecting the beam to a turning force which tends to turn the beam about the pivotal connection with the additional shoe or shoes. The beam is however supported against this tendency to turn by its pivotal connection with the truck frame. Another object of the invention is therefore to provide a novel brake arrangement of the general type above described but so designated and arranged that the beam and truck frame are not subject to a turning force such as just described.

Other objects and advantages will be apparent from the following more detailed description of the invention.

In the accompanying drawings; Fig. 1 is a fragmentary plan view of a railway vehicle truck embodying the invention; Fig. 2 is a fragmentary, side elevational view, with certain parts in section, of the truck shown in Fig. 1; and Fig. 3 is a sectional view taken on the line 3—3 of Fig. 2.

*Description of parts*

As shown in the drawings, the improved brake equipment is associated with a railway vehicle truck which, for the purpose of illustration, may comprise a truck frame 1 and a plurality of longitudinally spaced wheel and axle assemblies for carrying said frame; only a portion of said frame and of one wheel and axle assembly being shown in the drawings. Each wheel and axle assembly comprises a pair of laterally spaced wheels 2 which are secured to an axle 3 in any desired manner and in the usual spaced relation.

The truck frame 1 comprises side members 4 rigidly connected in spaced relation by end members 5 and transoms 6; (only one end member and transom being shown). The axle 3 is suitably journaled inboard and adjacent the wheel 2 in a journal bearing 7 slidably mounted between pedestal jaws 8 depending from the side frame 4. A spring 9 is interposed between each bearing 7 and the side member 4 for resiliently supporting the truck frame.

Located outboard of the wheel 2 is a pair of spaced brake drums 10. These drums are preferably formed integral with each other with an intervening space 11 provided between the two drums, and are secured to the axle 3 outboard of the wheel 2 for rotation therewith. Each of the drums 10 is provided with a peripheral, friction braking surface 12 which is adapted to be frictionally engaged by three brake shoes 13, 14 and 15 radially arranged around the drum for braking the wheel and axle assembly. The brake shoes 14 and 15 are located with the center of their braking faces below the horizontal centerline of the brake drums and at opposite sides thereof in clasp relation, while the brake shoes 13 are located above the drums on substantially the vertical center-line thereof. Each of the brake shoes is carried by a brake head 17 of usual construction and having on the face opposite the shoes spaced parallel supporting flanges 16 extending in the direction of the length of the shoe.

Located outboard of the wheel 2 and extending longitudinally of the truck frame 1 over the brake drums 10 is a combined brake torque and brake rigging support member 18. This member is preferably in the form of a single casting having laterally disposed vertically arranged side pieces 19 which at the end adjacent the truck transom 6 are pivotally supported on a pin 20. The pin 20 is carried by two spaced lugs 21 projecting upwardly from an outwardly extending portion 22 of the side frame 4.

A brake cylinder device 23, arranged to work in the direction of the length of member 18 and toward the end member 5 of the truck frame, is disposed between the side pieces 19 adjacent the pin 20 and is secured to said pieces by bolts 24. Beyond the brake cylinder device the two side pieces 19 converge and each extends centrally over the top of one of the two brake drums 10. Over the brake drums, the side pieces 19 are integrally connected together by a laterally extending top piece 25 and two spaced laterally extending bridge pieces 26.

The end of member 18 adjacent the end member 5 of the truck frame is provided with an outwardly extending lug 27 which is disposed to move vertically in a pocket 28 provided in a member 29 which extends outwardly from the truck side frame 4 adjacent the end member 5. The lug 27 rests on a spring seat 30 carried by a spring 31 which is seated on the bottom wall 32 of the pocket 28. Extending through a central opening in the spring seat 30 and an aligned opening in the wall 32 is a bolt 33 having on its upper end a head 34 which forms a stop for the spring seat to limit upward movement of the seat relative to the wall 32. Exteriorly of the pocket 25 there is screwed on to the lower end of the bolt 33 an adjusting nut 35 which is adapted for engagement by the wall 32 to limit upward movement of the bolt. Also screwthreaded on this portion of the bolt is a check nut 36 which is adapted to lock the nut 35 in its proper adjusted position on the bolt.

It will here be understood that the spring 31 is of considerably less value than the truck supporting spring 9 so that it may be compressed without compressing the spring 9. The spring 31 is however of such value that when the brakes are released it will support the member 18, and thereby parts of the brake mechanism carried by said member and to be hereinafter described, in their brake release position in which these parts are shown in Fig. 2.

The head 34 of the bolt 33 is preferably square in cross-section and extends through a correspondingly shaped opening in the lug 27 for holding said bolt against turning upon adjusting the nuts 35 and 36.

Interposed between and operatively engaging the upper face of the lug 27 and an upper wall 37 of the pocket 28 is a spring 38 which is adapted to oppose undue upward movement of the member 18 relative to the truck frame when the brake rigging is in its brake release position and as the truck is subjected to the usual service shocks.

Directly over the brake drums 10, the brake heads 17 carrying the shoes 13 are secured to the side pieces 19 of member 18 by a transversely extending pin 39 arranged substantially on the vertical center-line of the drums and extending through said side pieces and the supporting flanges 16 of the brake heads; it being noted that each of said side pieces 19 is disposed between the flanges 16 of one of the brake heads 17 for holding the brake shoes 13 centralized with respect to the braking faces 12 of the drums.

One end of a combined hanger and dead brake lever 40 is pivotally connected at its upper end to the pin 39 between the brake heads 17 carrying the two brake shoes 13. This lever extends diagonally through the space 11 between the two brake drums 10 and between the brake heads 17 carrying the brake shoes 14, and is pivotally connected to the flanges 16 of said heads by a transversely extending pin 41. Two parallel, diagonally extending hangers 42 are disposed opposite the hanger 40, one at each of the opposite faces of the two brake drums 10. The upper ends of the hangers 42 are pivotally connected to the pin 39 outside of the brake heads 17 while the lower ends of said hangers are disposed adjacent the opposite faces of the brake heads 17 carrying the brake shoes 15 and are pivotally connected thereto by a pin 43 which extends through said hangers and the side flanges 16 of said brake heads 17.

By the arrangement just described it will be noted that the pin 39 which secures the brake shoes 13 to the member 18 also carries through the hangers 40 and 42, the brake shoes 14 and 15 and the the brake heads carrying same.

A live brake lever 45 is disposed to operate between the brake heads 17 carrying the brake shoes 15 and is pivotally connected intermediate its ends to the pin 43. The lower end of this lever is connected by a pin 46 to one end of a horizontally extending tie rod 47. The tie rod 47 is disposed below the brake drums 10 in line to operate through the space 11 between said drums, and the opposite end of said rod is pivotally connected by a pin 48 to a portion 49 of the hanger 40, which extends below the pivot pin 41.

The brake cylinder device 23 comprises a casing secured to the side pieces 19 of the member 18 as above described. A non-pressure head 50 is secured over one end of the brake cylinder casing while disposed to reciprocate in said cylinder is a brake cylinder piston 51. The piston 51 has at one side a pressure chamber 52 which is connected to a pipe 53 through which fluid under pressure is adapted to be supplied to said chamber for actuating said piston to effect an application of the brakes and through which fluid under pressure is adapted to be released from said chamber in order to effect a release of the brakes.

At the opposite side of the brake cylinder piston there is provided a non-pressure chamber 54 which is open to the atmosphere in the usual manner. The piston 51 is provided with a piston rod 55 secured to the piston for movement therewith and extending through a suitable opening in the end of the non-pressure head. Outside the non-pressure head the piston rod 55 is provided with a yoked end 56 to receive the upper end of the brake lever 45 and which is secured to said lever by a pin 57. A brake cylinder release spring 44 is provided in the non-pressure chamber 54 and acts on the piston 51 for moving it to its release position upon the release of fluid under pressure from the pressure chamber 52. The pressure of the spring 44 is also sufficient to act, during this release movement of the brake cylinder piston, through the piston rod 55 and brake lever 45 and tie rod 47 to move the brake shoes 14 and 15 out of contact with the brake drums 10.

When the brake shoes 14 and 15 are thus disengaged from the brake drums 10, the pressure of the spring 31 on the end of the member 18 is adapted to support said member and thereby the several brake shoes in an elevated position defined by engagement of the adjusting nut 35 with the lower wall 32 of the pocket 38, in which position the upermost brake shoes 13 are also out of contact with the brake drums 10. With the several parts of the brake rigging thus supported in their brake release position just described, the brake drums 10 are free to rotate with the truck wheel 2 of the wheel and axle assembly, as will be evident.

Operation

If it is desired to effect an application of the brakes fluid under pressure is supplied through the pipe 53 to the pressure chamber 52 in the brake cylinder device. This pressure of fluid acting on the brake cylinder piston 51 then moves said piston against the pressure of the release spring 44 and rotates the live brake lever 45 in a clockwise direction, as viewed in Fig. 2. This rotation of the lever 45 acts through the pin 43 to move the brake shoes 15 into engagement with one side of the brake drums 10 and also acts through the tie rod 47 to pull the brake shoes 14 into braking engagement with the opposite side of said drums.

As the brake shoes 14 and 15 are thus forced against the drums 10 they move downwardly around the drums toward each other due to their disposition below the horizontal center-line of the drums. This downward movement of the brake shoes 14 and 15 acts through the hangers 40 and 42 on the pin 39 to turn the member 18 in a clockwise direction about the pin 20 and thus move the upper brake shoes 13 into braking engagement with the top portion of the drums 10; this movement of member 18 being opposed by the pressure of spring 31, as will be evident.

After the brake shoes 13 are thus moved into contact with the brake drums 10 they are pulled against said drums with a force equal to the combined downward pull of the clasp arranged shoes 14 and 15 on the hangers 40 and 42 and thus provide braking of the wheel and axle assembly which is in addition to that provided by the brake shoes 14 and 15.

The degree of pressure between the upper brake shoes 13 and brake drums 10 depends upon the downward pull of the brake shoes 14 and 15 which in turn depends upon the pressure of fluid supplied to the brake cylinder device to act on the brake cylinder piston 51, and may be varied by varying the pressure of said fluid in the usual manner, as will be obvious.

When the brakes are applied the member 18 and thereby its pivot pin 20 are relieved of the weight of the several brake shoes and other parts of the brake rigging and merely acts through the pin 39 to hold the brake shoes 13 against turning due to the drag of the brake drums on said shoes, and since the brake shoes 14 and 15 are connected directly through the rigid hangers 40 and 42 to the pin 39, it will be evident that the member 18 also acts to hold the shoes 14 and 15 against turning due to the drag of the brake drums thereon. The degree of pressure thus applied to the pin 20 is relatively small as compared to the forces acting on the hangers, levers and brake shoes and acts in a substantially horizontal direction and thus does not materially interfere with vertical movement of the truck frame relative to the wheel and axle assembly. The spring 31 is compressed when the brakes are applied and acts to dampen vertical movement of the truck frame, but this dampening effect is negligible, since the force of said spring is so small as compared to the weight of the truck frame and the portion of vehicle supported thereon. In other words, this novel brake arrangement provides for substantially free vertical movement of the truck frame when the brakes are applied.

It will also be noted that since the positioning of the brake shoes is controlled entirely by engagement of the shoes 13 with the drums 10, and also since the brake cylinder 23 and all other parts of the rigging are so associated as to move as a unit relative to the truck frame, the operation of the brake arrangement is independent of vertical movement or position of the truck frame with respect to the wheel and axle assembly, which provides for very accurate and fine graduated control of the degree of braking.

It will be noted that since the downward pull of the brake shoes 14 and 15 is transmitted directly through the hangers 40 and 42 to pin 39 for applying the brake shoes 13 against the brake drums 10, the pressure of the shoes 13 against said drums equals the sum of the downward pull of the shoes 14 and 15, regardless of the direction of rotation of the brake drums. The degree of braking of the wheel and axle assembly is therefore independent of the direction of movement of the vehicle truck with this improved arrangement.

When it is desired to effect a release of the brakes after an application the fluid under pressure is vented from the brake cylinder piston chamber 52 by way of pipe 53 and when reduced to a sufficient degree, the spring 44 acting on the brake cylinder piston 51 moves said piston back to its release position shown in the drawings. This movement of the brake cylinder piston turns the brake lever 45 in a counterclockwise direction, which acts through pin 43 and tie rod 47 to move the brake shoes 14 and 15 apart and out of engagement with brake drums 10. As the brake shoes 14 and 15 are thus disengaged from the drums 10 the spring 31 acting on the member 18 rocks said member in a counterclockwise direction. This movement of member 18 acts through pin 39 to lift the brake shoes 13 out of engagement with the brake drums 10 and also through the hangers 40 and 42 to lift the shoes 14 and 15 to their release positions. With all of the brake shoes thus disengaged from the brake drums 10 and returned to their release positions shown in the drawings said drums and the wheel and axle assembly are again free to rotate.

In order to assure that the brake shoes 14 will be moved out of contact with the brake drums 10 at the time the brakes are released, a stop 58 is arranged to be engaged by the brake lever 45 after sufficient movement thereof to pull the brake shoes 15 away from the drums 10 the desired degree. All further movement of the lever 45 then acts through the tie rod 47 to move the brake shoes 14 away from the drums.

It will be noted that the mass of the brake rigging at the left hand side of the pin 39, connecting said rigging to the member 18, is slightly greater than at the right hand side due to the weight of the portion of lever 45 disposed above the pin 43, and as a consequence, there is a possibility that the rigging when in its released condition might turn about the pin 39 in a counterclockwise direction sufficiently to effect dragging of the brake shoes 15 against the drums 10. In order to obviate this possibility, a stop 59 may be provided to be engaged by the hanger 40 when the brake shoes 14 are moved away from the brake drums 10 a chosen amount. In other words, the stops 58 and 59 may be so arranged as to loosely hold the brake rigging in such a position that the shoes 14 and 15, when in their release condition, will all be spaced substantially the same distance from the brake drums. The stop 58 may be provided on a portion 60 depending diagonally from the outwardly extending portion 22 of the truck frame, while the stop 59 may be provided on a similar portion depending from the extension 29 of the truck frame.

While the invention has been described in detail in connection with two brake drums secured to the axle 3 outboard of the wheel 2 it will be understood that said drums could be located inboard of the wheel 2, if desired, or only one drum, instead of two, could be located in either position if one drum would provide a sufficient degree of braking of the wheel and axle assembly. It will be further understood that in cases where sufficient braking could be obtained by the use of three radially arranged brake shoes, instead of three pairs as above described, the brake mechanism could be arranged so that the shoes would engage the tread of the wheel 2. In the later case the brake drum or drums would of course be omitted.

From the above description of the novel brake arrangement it will be noted that when the brake shoes are in their release condition all parts of the brake rigging, except the brake drums 10, are carried by the truck frame. In effecting an application of the brakes, however, the downward pull of the clasp arranged brake shoes is employed to operate the additional brake shoes located at the top of the drums to provide for additional braking of the wheel and axle assembly; the truck frame 1 not being subjected to any of the forces incident to braking except for the relatively small force applied to the pin 20 through the member 18 for holding the brake shoes against turning with the brake drums, plus the relatively light compressive force of spring 31. The truck frame 10 is thus substantially free for vertical movement or vibration while the brakes are applied and in no way interferes with the control of the brakes on the wheel and axle assembly.

The degree of braking of the brake shoes 13 is controlled entirely by the degree of downward pull of the brake shoes 14 and 15, and while this downward pull depends upon the direction of rotation of the drums 10, the combined pull of the shoes 14 and 15 applied to the pin 39 and thereby to the shoes 13 is the same regardless of the direction of rotation of said drums, so that the degree of braking attained from the shoes 13 is independent of the direction of movement of the vehicle truck.

While only one embodiment of the invention has been shown and described in detail by way of illustration it is not intended to limit its scope to that embodiment or otherwise than by the terms of the appended claims.

Having now described our invention, what we claim as new and desire to secure by Letters Patent, is:

1. A brake mechanism for an axle of a railway vehicle truck having a truck frame carried by said axle and having an annular rotatable member to be braked secured to rotate with said axle and provided with a peripheral braking surface said mechanism comprising a first friction brake element arranged to frictionally engage a portion of said surface to brake said element, means for actuating said first brake element, a second friction brake element arranged to frictionally engage a circumferentially spaced portion of said surface for also braking said axle, a tension member connected at one end to one of said brake elements and at the opposite end to the other of said brake elements, support means carried by said frame and connected to said second brake element for normally supporting said second brake element from said frame out of contact with said surface and operative through said tension member to also support said first braking element, said support means being also operative to provide for movement of said second named brake element relative to said frame into contact with said surface, both of said brake elements being so arranged relative to said rotatable element that operation of the said first brake element is operative to effect movement of the said second brake element relative to said frame into braking contact with said surface, and torque means connecting said brake elements to said frame for holding said elements against turning with said rotatable member.

2. A brake mechanism for an axle for a railway vehicle truck having a truck frame carried by said axle and having an annular rotatable member to be braked secured to rotate with said axle and provided with a peripheral braking surface, said mechanism comprising a first friction brake element adapted to frictionally engage said surface for braking said axle, means for supporting said first brake element from said frame out of contact with said surface and providing for movement of said first brake element relative to said frame into frictional braking engagement with said surface, a second friction brake element spaced from said first brake element and adapted to frictionally engage said surface for also effecting braking of said rotatable element, actuating means connected to said second brake element operative to move same into and out of braking engagement with said surface, a tension member connected at one end to said first brake element and at the opposite end to said second brake element, said brake elements being so arranged relative to each other around said braking surface that braking engagement of said second brake element with said surface is operative through said tension member to effect movement of said first brake element relative to said frame into braking engagement with said surface, and torque means connecting said brake elements to said frame securing said brake elements against turning with said rotatable element.

3. A brake mechanism for an axle of a railway vehicle truck having a truck frame carried by said axle and having an annular rotatable member to be braked secured to rotate with said axle and provided with a peripheral braking surface, said mechanism comprising a first friction brake element arranged to engage said braking surface, means for applying braking pressure to said first brake element in such a direction that an extension of the line of force is disposed at one side of the axis of said rotatable member, for forcing said first brake element into braking engagement with said rotatable element, a second friction brake element for frictionally engaging a portion of said rotatable member at the trailing side of said first brake element less than one hundred eighty degrees from the portion engaged by said first brake element, a tension member pivotally connected at one end to said first brake element and at the opposite end to said second brake element and operative to actuate said second brake element upon operation of said first brake element, a structure connecting said second brake element to said frame for holding both of said brake elements against turning with said rotatable member, and means for operating said structure upon release of said brake elements from said rotatable member to support said brake elements from said frame.

4. A brake mechanism for an axle of a railway vehicle truck having a truck frame carried by said axle and having an annular rotatable member to be braked secured to rotate with said axle and provided with a peripheral braking surface, said mechanism comprising a first friction brake element arranged to be forced into braking engagement with said rotatable element by a force the line of action of which is below the horizontal center-line of said rotatable member, means for applying said force to said first brake element, a second friction brake element disposed at the trailing side of said first brake element for engaging a portion of said rotatable element above said horizontal center-line, a tension member pivotally connected at one end to one of said brake elements and at the opposite end to the other of said brake elements, support means connecting said second brake element to said frame for normally supporting same from said frame out of contact with said rotatable element and providing for movement of said second brake element relative to said frame into braking engagement with said rotatable member, said support means being also operative through said tension member for normally supporting said first brake element, means for actuating said first brake element, and thereby said tension member to actuate said second brake element, and means connecting said second brake element to said frame for holding same and thereby said first brake element against turning with said rotatable member.

5. A brake mechanism for an axle of a railway vehicle truck having a truck frame carried by said axle and having an annular rotatable member to be braked secured to rotate with said axle and provided with a peripheral braking surface, a rigid member disposed over said rotatable member and extending longitudinally of said truck frame, means providing a pivotal connection between one end of said rigid member and said truck frame, a first brake element disposed above said rotatable member on the vertical center-line thereof and operative to frictionally engage said rotatable member to effect braking thereof, a transversely extending pin pivotally connecting said first brake element to said rigid member, a second brake element disposed to frictionally engage said rotatable member below the horizontal center-line thereof, a combined hanger and brake operating member pivotally connected at one end to said pin and at the opposite end to said second brake element, a brake cylinder device carried by said rigid member and operatively connected to said second brake element for controlling movement thereof into and out of braking engagement with said rotatable member, said second brake element upon braking engagement with said rotatable member being operative through said combined hanger and brake operating member to pull said first brake element into braking engagement with said rotatable member, and resilient means operative on the opposite end of said rigid member to normally supported both of said brake elements from said frame and providing for movement of said rigid member and said second brake element relative to said frame to effect engagement between said second brake element and said rotatable member.

6. A brake mechanism for the axle of a railway vehicle truck having a truck frame carried by said axle and having a rotatable member secured to rotate with said axle and provided with a peripheral braking surface, said mechanism comprising at least two friction brake elements arranged in clasp relation at opposite sides of said rotatable element for engagement with said surface, a lever connected to one of said clasp arranged elements for effecting movement thereof into braking engagement with said surface, means for effecting movement of the other clasp arranged element into braking engagement with said surface and for also operating said lever, said lever having a fulcrum movable substantially radially of said rotatable member, and at least one additional friction brake element carried by said fulcrum and movable into contact with said surface upon operation of said lever.

7. A brake mechanism for the axle of a railway vehicle truck having a truck frame carried by said axle and having a rotatable member secured to rotate with said axle and provided with a peripheral braking surface, said mechanism comprising at least two friction brake elements arranged at opposite sides of said rotatable member in clasp relation therewith and below the horizontal center-line of said rotatable member, at least one additional brake element disposed to engage said surface at the top of said rotatable member, means securing said additional brake element against rotation with said rotatable member and providing for movement thereof radially of said rotatable member, a lever having a fulcrumed connection with said additional brake element and operatively connected to one of said clasp brake elements for effecting movement of said additional brake element into braking engagement with said surface upon operation of said one clasp brake element, and means for operating the other clasp brake element into braking engagement with said surface and for also operating said lever.

8. A brake mechanism for the axle of a railway vehicle truck having a truck frame carried by said axle and having a rotatable member secured to rotate with said axle and provided with a peripheral braking surface, said mechanism comprising at least two friction brake elements arranged in clasp relation at opposite sides of said rotatable member and below the horizontal center-line thereof, a lever for effecting movement of one of said brake elements into braking engagement with said surface, actuating means for effecting operation of said lever and for effecting movement of the other clasp brake element into braking engagement with said surface, a fulcrum for said lever disposed above said center-line substantially mid-way between said clasp brake elements, a movable member carried by said fulcrum for engagement with said surface, and means connecting said movable member to said other clasp brake element, said means and lever cooperating to move said member into contact with said surface upon operation of said actuating means.

9. A brake mechanism for the axle of a railway vehicle truck having a truck frame carried by said axle and having a rotatable member secured to rotate with said axle and provided with a peripheral braking surface, said brake mechanism comprising at least two friction brake elements arranged in clasp relation at opposite sides of said rotatable member and below the horizontal center-line thereof, at least one additional brake element disposed above said rotatable member, a connecting member pivotally connected at one end to said additional brake element and at the opposite end to one of said clasp brake elements, another connecting member pivotally connected at one end to said additional brake element and at the opposite end to the other of said clasp brake elements, and means for moving said clasp brake elements into braking engagement with said surface, said clasp brake elements being operative upon braking engagement with said surface to operate said connecting members to pull said additional brake element into braking engagement with said surface.

10. A brake mechanism for the axle of a railway vehicle truck having a truck frame carried by said axle and having a rotatable member secured to rotate with said axle and provided with a peripheral braking surface, said brake mechanism comprising at least two friction brake elements arranged in clasp relation at opposite sides of said rotatable member below the horizontal center-line thereof, at least one additional brake element disposed above said rotatable member substantially mid-way between said clasp brake elements, support means connecting said additional brake element to said truck frame for securing said additional brake element against rotation with said rotatable member and providing for radial movement of said additional brake element relative to said rotatable member, a lever connected to one of said clasp brake elements for actuating same and having a fulcrum connection with said support means, a tie member pivotally connected at one end to said fulcrum connection and at the opposite end to the other of said clasp brake elements, operating means for said other clasp brake element and for said lever operative to effect movement of said clasp brake elements into and out of braking engagement with said rotatable member, said lever and tie member being operative by said clasp brake elements when in braking engagement with said rotatable member to effect movement of said additional brake element into braking engagement with said rotatable member, and means carried by said frame and operative on said support means for supporting all of said brake elements from said truck frame upon release of said brake elements from said rotatable member.

11. A brake mechanism for the axle of a railway vehicle truck having a truck frame carried by said axle and having a rotatable member secured to rotate with said axle and provided with a peripheral braking surface, said brake mechanism comprising at least three friction brake elements arranged radially around said rotatable member for braking engagement with said surface, two of said brake elements being arranged in clasp relation at opposite sides of said rotatable member and below the horizontal center-line thereof and the third brake element being disposed above said rotatable member substantially mid-way between the clasp arranged brake elements, means for effecting movement of said clasp brake elements into and out of braking engagement with said rotatable member, a link-like element operatively connected at one end to one of said clasp brake elements, another link-like element operatively connected at one end to the other clasp brake element, means providing a pivotal connection between the other ends of said link-like elements and said third brake element, said link-like elements being operative by said clasp brake elements upon frictional braking engagement with said surface to pull said third brake element radially of said rotatable member into braking engagement with said surface, and means operative upon disengagement of said clasp brake elements from said surface for disengaging said third brake element from said surface and for supporting all of said brake elements from said truck frame.

12. A brake mechanism for the axle of a railway vehicle truck having a truck frame carried by said axle and having a rotatable member secured to rotate with said axle and provided with a peripheral braking surface, said brake mechanism comprising at least two brake elements disposed in clasp relation at opposite sides of said rotatable member and below the horizontal center-line thereof for braking engagement with said surface, a dead lever connected to one of said clasp brake elements for effecting movement thereof into braking engagement with said surface, means for effecting movement of the other clasp brake element into engagement with said surface and operatively connected to said dead lever for effecting the operation thereof, a member secured to said truck frame providing a fulcrum for said lever which is movable radially of said rotatable member, a tension member connected to said fulcrum and to said other clasp brake element, and at least one additional brake element carried by said fulcrum for engaging said surface, said clasp brake elements being operative upon engagement with said rotatable member to operate said dead lever and tension member to pull said additional brake element into braking engagement with said surface.

13. A brake mechanism for an axle of a railway vehicle truck having a truck frame resiliently supported on said axle, said axle having a rotatable member secured to rotate therewith and provided with a peripheral friction braking surface, said brake mechanism comprising at least two brake elements arranged in clasp relation at opposite sides of said rotatable element for braking engagement with said surface, a lever connected to one of said clasp brake elements for effecting movement thereof into and out of braking engagement with said rotatable member, actuating means for operating said lever and connected to the other clasp brake element for controlling movement thereof into and out of braking engagement with said rotatable member, means providing a fulcrum for said lever above said rotatable element and being operable to move said fulcrum substantially radially of said rotatable member, a tension member connecting said fulcrum to said other clasp brake element, at least one additional brake element carried by said fulcrum, said clasp brake elements being operative upon braking engagement with said rotatable member to operate said lever and tension member to effect movement of said additional brake element into braking engagement with said rotatable member, and resilient means carried by said frame and operative on said fulcrum to support all of said brake elements from said frame when said brake elements are disengaged from said rotatable member.

14. A brake mechanism for an axle of a railway vehicle truck having a truck frame resiliently supported on said axle, said axle having a rotatable member secured to rotate therewith and provided with a peripheral friction braking surface, said brake mechanism comprising at least two friction brake elements arranged in clasp relation at opposite sides of said rotatable member for braking engagement with said surface, a lever operatively connected to one of said clasp brake elements for effecting movement thereof into and out of braking engagement with said rotatable member, means operatively connected to the other clasp brake element for controlling movement thereof into and out of the braking engagement with said rotatable member and for also operating said lever, a rigid beam-like member having at one end a pivotal connection with said frame, means carried by said beam-like member providing a fulcrum for said lever, a tension member connected at one end to said fulcrum and at the opposite end to said other clasp brake element, at least one additional brake element carried by said fulcrum for braking engagement with said surface, said clasp brake elements being operative through said lever and tension member upon braking engagement with said rotatable member to effect movement of said additional brake element into braking engagement with said rotatable member, and a spring carried by said frame and acting on said beam-like member for supporting all of said brake elements from said frame upon disengagement thereof from said rotatable member.

15. A brake mechanism for an axle of a railway vehicle truck having a truck frame resiliently supported on said axle, said axle having a rotatable member secured to rotate therewith and provided with a peripheral friction braking surface, said brake mechanism comprising at least two clasp brake elements arranged in clasp relation at opposite sides of said rotatable member for braking engagement with said surface, a dead lever connected to one of said clasp brake elements for controlling movement thereof into and out of braking engagement with said surface, a live lever having a pivotal connection with the other clasp brake element and operatively connected to said dead lever for controlling movement of said clasp brake elements into and out of braking engagement with said rotatable member, said dead lever having a fulcrum disposed above said rotatable member, a tension member connecting said fulcrum to the connection between said live lever and the clasp brake element connected thereto, and at least one additional friction brake element connected to said fulcrum for braking engagement with said rotatable member, said clasp brake elements being operative upon braking engagement with said rotatable member to operate said dead lever and tension member to effect movement of said additional brake element into braking engagement with said rotatable member.

16. A brake mechanism for an axle of a railway vehicle truck having a truck frame resiliently supported on said axle, said axle having a rotatable member secured to rotate therewith and provided with peripheral friction braking surface, said brake mechanism comprising at least two brake elements arranged in clasp relation at opposite sides of said rotatable member and below the horizontal center-line thereof for engaging said surface, at least one additional brake element disposed above said rotatable member on the vertical center-line thereof and adapted to be moved into frictional braking engagement with said surface, a beam-like member extending longitudinally of said truck frame and having at one end a pivotal connection therewith, means providing an operating connection between said additional brake element and said beam-like member, a dead lever having a fulcrum on said beam-like member and operatively connected to one of said clasp brake elements for controlling movement thereof into and out of braking engagement with said rotatable member, a tension member connected to said fulcrum and having a pivotal connection with the other of said clasp brake elements, a live lever operatively connected to said other clasp brake element and to said dead lever for controlling movement of said clasp brake elements into and out of braking engagement with said surface, said clasp brake elements being operative upon braking engagement with said surface to exert force through said dead lever and tension member on said additional brake element for effecting movement thereof into braking engagement with said surface, and spring means carried by said truck frame and operative on said beam-like member for disengaging said additional brake element from said rotatable member upon disengagement of said clasp brake elements from said rotatable member and for supporting all of said brake elements from said truck frame.

17. A brake mechanism for an axle of a railway vehicle truck having a truck frame resiliently supported on said axle, said axle having a rotatable member secured to rotate therewith and provided with peripheral friction braking surface, said brake mechanism comprising at least two brake elements arranged in clasp relation at opposite sides of said rotatable member and below the horizontal center-line thereof for engaging said surface, at least one additional brake element disposed above said rotatable member on the vertical center-line thereof and adapted to be moved into frictional braking engagement with said surface, a beam-like member extending longitudinally of said truck frame and having at one end a pivotal connection therewith, means providing an operating connection between said additional brake element and said beam-like member, a dead lever having a fulcrum on said beam-like member and operatively connected to one of said clasp brake elements for controlling movement thereof into and out of braking engagement with said rotatable member, a tension member having a fulcrum connection with said beam-like member and a pivotal connection with the other of said clasp brake elements, a live lever operatively connected to said other clasp brake element and to said dead lever for controlling movement of said clasp brake elements into and out of braking engagement with said surface, a brake cylinder device carried by and movable with said beam-like member and operatively connected to said live lever for controlling the operation thereof, said clasp brake elements being operative upon braking engagement with said surface to exert force through said dead lever and tension member on said additional brake element for effecting movement thereof into braking engagement with said surface, and spring means carried by said truck frame and operative on said beam for disengaging said additional brake element from said rotatable member upon disengagement of said clasp brake elements from said rotatable member and for supporting all of said brake elements from said truck frame.

18. A brake mechanism for an axle of a railway vehicle truck having a truck frame carried by said axle and having a rotatable member secured to rotate with said axle and provided with a peripheral braking surface, said brake mechanism comprising at least two clasp brake elements arranged at opposite sides of said rotatable member and below the horizontal center-line thereof in clasp relation, and at least one additional brake element disposed above said rotatable member on the vertical center-line thereof, a dead lever having operating connections with one of said clasp brake elements and with said additional brake element, a link element connecting the other clasp brake element with said additional brake element, a live lever pivotally connected to said other brake element, a tie rod connecting said levers, said live lever being operative upon movement in one direction to effect movement of one of said clasp brake elements into braking engagement with said surface and also operative to effect operation of said tie rod and dead lever to effect movement of the other of said clasp arranged brake element into braking engagement with said surface, means acting on said live lever for effecting movement thereof in the opposite direction to disengage said clasp brake elements from said rotatable member, stop means for limiting movement of one of said clasp brake elements in the direction away from said rotatable member, said clasp brake elements being operative upon braking engagement with said rotatable member to provide forces in said dead lever and link element for drawing said additional brake element into braking engagement with said surface, and a spring carried by said truck frame and acting on said additional brake element for effecting movement of said additional brake element and said clasp brake elements in a vertical direction relative to said rotatable member upon disengagement of said clasp brake elements from said rotatable member.

19. A brake mechanism for an axle of a railway vehicle truck having a truck frame carried by said axle and having a rotatable member secured to rotate with said axle and provided with a peripheral braking face, said brake mechanism comprising at least three friction brake elements disposed around said rotatable member for frictionally engaging said surface, two of said brake elements being disposed in clasp relation below the horizontal center-line of said rotatable member and the third brake element being disposed above said rotatable member on the vertical center-line thereof, a diagonally arranged dead lever operatively connected to one of said clasp arranged brake elements and having a fulcrum connection with said third brake element, a diagonally disposed link-like member having a pivotal connection with the other of said clasp arranged brake elements and connected to said third brake element at the fulcrum connection with said dead lever, and a live lever pivotally connected to said other clasp brake element and operatively connected to said dead lever for controlling movement of all of said brake elements into and out of braking engagement with said rotatable member, said dead lever and link-like member being operative upon braking engagement of said clasped arranged brake elements with said rotatable member to effect movement of said third brake element into braking engagement with said rotatable member.

20. A brake mechanism for a wheel and axle assembly of a railway vehicle truck comprising two brake drums arranged in spaced relation and secured to rotate with said assembly, at least three friction brake elements arranged around each of said drums with two of said elements disposed at the opposite sides of each drum below the horizontal center-line thereof in clasp relation and the third brake element for each drum being disposed above the drum on the vertical center-line thereof, diagonally disposed means extending through the space between said drums and connected at one end to the brake elements at one side of the two drums, a pin providing a fulcrum connection for the other end of said member with said third brake element on both drums, a pair of diagonally extending links one disposed adjacent the outer face of each of said drums, one end of both of said links having a fulcrum connection with said pin while the opposite end of both of said links is pivotally connected to the other clasp arranged brake element on both drums, means for operating said clasp arranged brake elements into braking engagement with said drums, said clasped arranged brake elements being operative upon braking engagement with said drums to act through said member and links for drawing the brake elements disposed above said drums into frictional braking engagement therewith.

21. A brake mechanism for a wheel and axle assembly of a railway vehicle truck having a truck frame, said mechanism comprising a brake drum secured to rotate with said assembly, a beam-like member extending lengthwise of said truck frame over said drum and having at one end a pivotal connection with said frame, a fulcrum pin carried by said beam-like member substantially over the vertical center-line of said drum, a brake element carried on said pin, a pair of brake elements disposed at opposite sides of said drum below the horizontal center-line thereof and in clasp relation, a dead lever fulcrumed on said pin and pivotally connected to one of said clasp arranged brake elements, a link fulcrumed at one end on said pin and pivotally connected at the opposite end of the other clasp arranged brake element, a live lever having a pivotal connection with said other clasp arranged brake element and operatively connected to said dead lever for operating said clasp arranged brake elements into braking engagement with said drum, said clasp arranged brake elements being operative upon braking engagement with said drum to act through said dead lever end link for pulling the brake element disposed above said drum into braking engagement therewith, resilient means acting on said live lever for operating same to effect disengagement of said clasp arranged brake elements from said drum, and a spring carried by said truck frame and acting on said beam-like member for disengaging said third brake element from said drum and for supporting all of said brake elements upon disengagement of said clasp brake elements from said drum.

22. In a brake mechanism for a railway vehicle truck, in combination, a braking surface carried by and rotatable with a wheel and axle assembly of the truck, clasp arranged brake elements movable into braking engagement with said surface, another brake element carried by the frame of the truck and movable relative thereto into braking engagement with said surface, operatively connected live and dead levers for actuating said clasp arranged brake elements, a fulcrum for said dead lever carried by said other element, and means operatively connecting said fulcrum and live lever, said means and dead lever being operative by the clasp arranged brake elements upon the braking engagement of the clasp arranged brake elements with said surface for actuating said other brake element.

23. In a brake mechanism for a railway vehicle truck in combination, a braking surface carried by and rotatable with a wheel and axle assembly of the truck, clasp arranged brake elements movable into braking engagement with said surface, another brake element carried by the frame of the truck and movable relative thereto into braking engagement with said surface, operatively connected live and dead levers for actuating said clasp arranged brake elements, a fulcrum for said dead lever located on the vertical center line of the wheel and axle assembly and carried by said other element, and means operatively connecting said fulcrum and live lever, said means and dead lever being operative by the clasp arranged brake elements upon the braking engagement of the clasp arranged brake elements with said surface for actuating said other brake element.

24. In a brake mechanism for a railway vehicle truck, in combination, a braking surface carried by and rotatable with a wheel and axle assembly of the truck, clasp arranged brake elements movable into braking engagement with said surface, another brake element carried by the frame of the truck and movable relative thereto into braking engagement with said surface, operatively connected live and dead levers for actuating said clasp arranged brake elements, a fulcrum for said dead lever carried by said other element, and means operatively connecting said fulcrum and live lever, said means and fulcrum supporting said live lever and one of said clasp arranged brake elements from said other brake element, and said dead lever supporting the other of said clasp arranged brake elements, said means and dead lever being operative upon the engagement of the clasp arranged brake elements with said surface for actuating said other brake element.

25. In a brake mechanism for a railway vehicle truck, in combination, a braking surface carried by and rotatable with a wheel and axle assembly of the truck, clasp arranged brake elements movable into braking engagement with said surface, another brake element carried by the frame of the truck and movable relative thereto into braking engagement with said surface, operatively connected live and dead levers for actuating said clasp arranged brake elements, said dead lever sloping upwardly and inwardly toward the vertical center line of the wheel and axle assembly, a member sloping upwardly and outwardly toward said vertical center-line, said member being operatively connected at its lower end to said live lever, and a fulcrum operatively connecting the upper ends of said dead lever and member together and to said other brake element, said member and dead lever being operative by said clasp arranged brake elements when the elements are in braking engagement with said surface for actuating said other brake element into engagement with said surface.

RANKIN J. BUSH.
WILLIAM H. GLASS.